Figure 1:
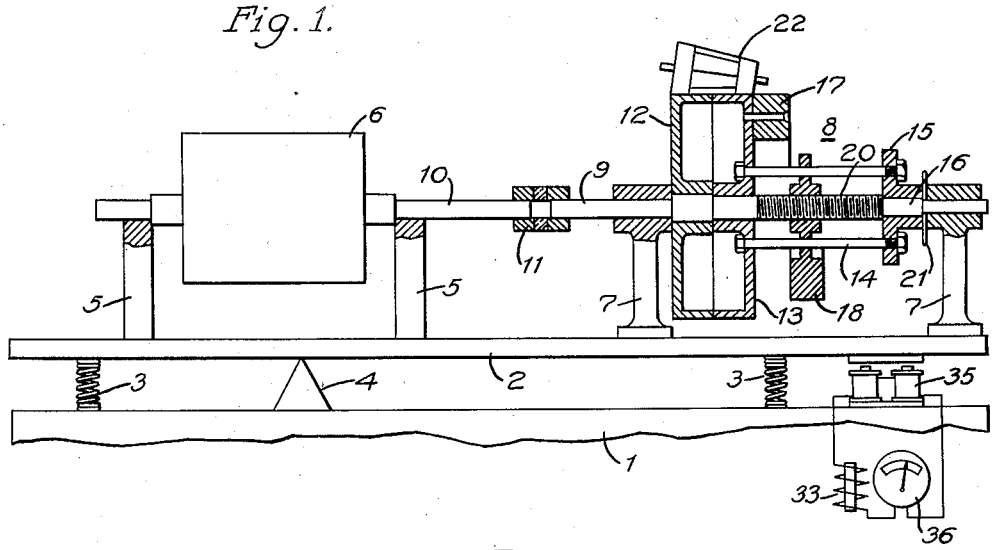

Dec. 13, 1927.　　　　　　　　　　　　　　　　1,652,505
W. E. TRUMPLER
BALANCING MACHINE
Filed July 11, 1924

WITNESSES:
G. S. Neilson
W. B. Jaspert

INVENTOR
William E. Trumpler
BY
Wesley G. Carr
ATTORNEY

Patented Dec. 13, 1927.

1,652,505

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed July 11, 1924. Serial No. 725,351.

My invention relates to balancing devices, more particularly to machines for automatically testing the dynamic unbalance of rotors, such as armatures for dynamo-electric machines and the like.

It is among the objects of my invention to provide a counter-balancing mechanism which shall be of simple and durable construction, which shall be efficient in determining the amount and relative location of unbalanced masses in rotating bodies and which shall be capable of testing rotors for dynamic unbalance in relatively large quantities.

It is a further object of my invention to provide a balancing mechanism which shall be automatic in its function, requiring a minimum amount of adjustments and practically no attention by the operator, such machines being capable of automatically producing a couple for counter-acting the dynamic unbalance of the rotors being tested.

In my co-pending application, Serial No. 725,352 filed July 11, 1924, I have described a counter-balancing mechanism for use in balancing machines which is capable of producing a couple by means of a pair of counter-balanced weights which are electromagnetically adjusted by electrical control means manipulated by the operator in accordance with the amount of unbalance registered by an indicating device.

The counter-balanced mechanism consists of two pairs of disks, each pair of which are in frictional engagement, one of said disks carrying a counter-balanced weight and a screw mechanism associated with one of the pairs of disks having another counter-balanced weight in screw thread engagement therewith. A plurality of conical friction rollers capable of engaging the disk members are actuated by electromagnets to make contact with the disks for the purpose of effecting creepage or relative angular displacement of the disk members to manipulate the counter-balance weights, both of which are capable of being angularly displaced with respect to the rotor to be tested and the weight associated with the screw mechanism being axially movable relative to the weight carried by one of said disks for the purpose of producing a couple for conteracting the unbalanced mass of the rotor.

My present invention embodies a similar counter-balancing mechanism which differs from the aforesaid device in that I utilize but a single pair of disk members for actuating the counter-balanced weights and in that its function is entirely automatic, requiring no manipulation of the electromagnets by the operator and, therefore, productive of speedy and consistent results, extreme accuracy and requires no skill on the part of the operator for carrying out the entire cycle of operation for balancing a rotor.

Figure 2:
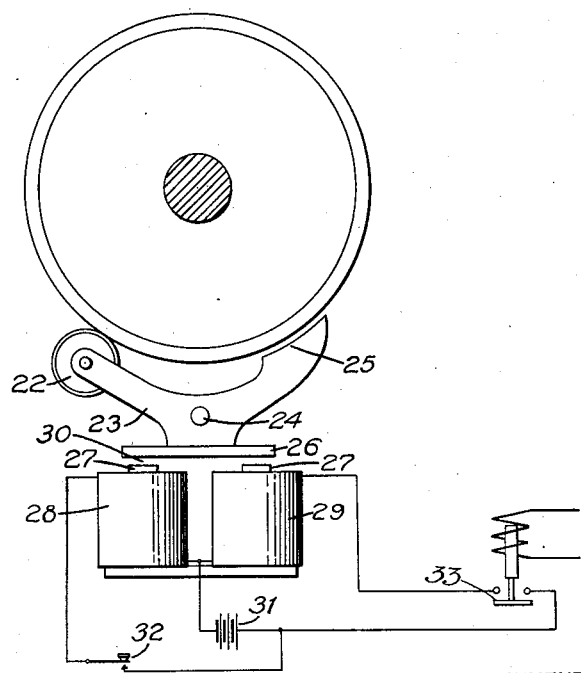

In the accompanying drawing constituting a part hereof and in which like reference characters designate like parts:

Figure 1 is a schematic view of a dynamic balancing machine embodying the principles of my invention, and Fig. 2 is a similar view illustrating the actuating mechanism for the friction disk and the electrical apparatus for automatically carrying out this function.

Referring to Fig. 1, the device therein illustrated comprises a base member 1 having a bed member 2 mounted by a plurality of coil springs 3 thereon and having a movable fulcrum member 4 interposed between the bed and base members in the well known manner to make it adjustable along the longitudinal axis of the machine member in order to obtain a fulcrum position in any transverse plane of the rotor to be tested.

A plurality of pedestal members 5 for journalling a rotor 6 are secured to the bed 2 and pedestals 7 for journalling the counter-balancing mechanism 8 are similarly secured to the bed member 2. The counter-balancing mechanism 8 comprises a spindle 9 which is co-axially alined with the shaft 10 of the rotor 6 and coupled thereto by any suitable type of coupling 11. A friction disk 12 is securely mounted on the shaft 9 and a similar disk 13 is rotatably mounted thereon and secured by rods 14 to a flanged sleeve 15 which is rotatably mounted on the reduced portion 16 of the shaft member 9. A counter-balance weight 17 is fixed to the disk 13 and a similar weight 18, having openings therein to permit free passage of the rods 14, is mounted in screw-threaded engagement with the threaded portion 20 of the shaft 9. A spring clip 21 is disposed between the shoulder of the flanged sleeve 15 and the face of the pedestal 7 to provide axial pressure of the disk 13, rods 14 and sleeve 15 which rotate as a unit.

A conical friction roll 22, Fig. 2, is rotatably mounted on a roller arm 23 which is pivotally mounted to the machine frame by pivot bolt connection 24. One end of the roller arm is provided with a curved face 25, the radius of which is equal to the radius of the disk 13 which functions as a brake shoe for interrupting the rotatory movement of said disk. The roller 22 is of sufficient face width to engage the faces of both the disks 12 and 13, whereas, the brake shoe engages only the disk 13 for the purpose of quickly returning the weight 18 to its starting position. The lower end of the roller arm 23 is provided with an iron plate 26, Fig. 2, which is in alignment with the cores 27 of a pair of electromagnets 28, and 29, a suitable air gap 30 being provided between the plate 26 and core 27 to provide a certain amount of rocking movement of the arm 23 when the magnets are energized to either engage the roller 22 or the brake surface 25 with the friction disk members.

The electromagnets 28 and 29 are connected to a battery 31, the magnet 28 having a contact 32 for energizing the same and the magnet 29 is connected to a relay 33 which is connected to a pair of induction coils 35, Fig. 1, which are mounted in proximity to the underside of the oscillatable bed member 2. The induction coil circuit includes an indicator 36 which indicates the relative amount of vibratory motion of the bed member 2.

The operation of this device is briefly as follows: The rotor 6 and the counterbalancing mechanism are rotated by a common source of power such as a belt or gear connected motor which may be mounted on the bed 1 or on a separate base. A fulcrum member 4 is moved in any desired transverse plane such as either of the planes lying in the end faces of the rotor and the speed of rotation is subsequently adjusted to synchronize the speed of rotation with the period of vibration of the oscillatable bed about the fulcrum point. The dynamically unbalanced mass of the rotor 6 produces a movement about the fulcrum 4 which imposes an impulse force on the oscillatable bed member indicated by the indicator 36 by inducing a current in the induction coils 35.

This current energizes the electromagnet 29 through the relay 33 thus tilting the plate 26 to rock the arm 23 thereby effecting engagement of the conical roll 23 with the friction disks 12 and 13 which effects a slippage or creepage between the disk members by virtue of the difference in the lengths of the peripheries of the portion of the friction roller 22 touching the respective disks. The actual pressure of the spring 21 exerted on the disks maintains sufficient frictional contact therebetween to rotate them without slippage when the conical roller 22 is disengaged, however, the frictional contact of the roller is sufficient to overcome the friction of the engaging faces of the disk so that angular displacement of the disk members is effected to produce relative angular motion between the rotor 6 and the disk 13, counterbalance weight 18, the tie-rods 14 and the sleeve 15 which operate as a unit.

The relative rotary movement of the counter-balance weight 18 and the shaft 9 which is coupled to the roller 6 produces axial movement of the weight 18 by virtue of its screw-threaded engagement with the thread 20 of the shaft 9. The axial movement of the weight 18 relative to the weight 17 which is fixed against axial movement produces an ever increasing couple that counteracts the unbalanced mass of the rotor 6.

Since both the weights 17 and 18 are moved during the actual movement of the weight 18, the counterbalanced mechanism simultaneously functions to create a couple for counterbalancing the unbalance in the rotor and for effectively locating the counterbalance weight relative to the location of the unbalanced mass of the rotor. When the unbalanced mass is properly compensated by the counterbalance weights, the oscillatable bed member 2 comes to rest and thereby reduces the current induced in the coils 35 to a minimum, thereby de-energizing the magnet and releasing the roller 22 so that no further slip between the friction disks 12 and 13 takes place. This is an indication that the balancing operation is completed.

When the machine is stopped and the rotor corrected for the unbalance, it is set to its normal operating position by rotating the rotor 6 with the braking surface 25 of the rocker arm 23 in engagement with the disks 13. This is accomplished by closing the contact 32 to energize the magnet 28 which tilts the rocker arm 23 in the opposite direction from that for engaging the roller 22. When the disk 13 is thus held stationary, the weight 18 quickly returns to its original position in line with the weight 17, and the contact 32 is released and the balancing operation is repeated as above.

If the rotor has not been properly corrected, the bed member 2 will again oscillate which induces the current in the magnet circuit to engage the roller with the friction disk to adjust the counterbalancing weights.

The screw thread 20 of the shaft 9 may be of any suitable pitch but is preferably of a relatively fine pitch to obtain a very accurate balance.

It is evident from the foregoing description of my invention that balancing machines made in accordance therewith provide a simple and efficient means for testing the dynamic balance of rotors and the automatic feature particularly, greatly facilitates the balancing operation and eliminates the possibility of error where the counter balancing adjustments depend upon the skill of an operator. With the automatic function of the counterbalancing mechanism, a single operator can attend several machines and thereby materially reduce the heretofore excessive cost of balancing of rotors practically on a commercial basis.

Although I have described a specific embodiment of my invention, it will be obvious to those skilled in the art that various modifications may be made in the design and arrangement of the several co-operating parts and the application of the automatic device without departing from the principles herein set forth.

I claim as my invention:—

1. A balancing machine for testing the balance of rotating bodies comprising an oscillatable bed member, a balancing mechanism associated therewith and automatic means associated with said bed for actuating said balancing mechnism.

2. A balancing machine for testing the balance of rotating bodies comprising an oscillatable bed member, a balancing mechanism associated therewith and automatic means associated with said bed for operating said balancing mechanism.

3. A balancing machine for testing the balance of rotating bodies comprising an oscillatable bed member, means for journalling for rotation on said bed a body to be tested and means associated with said bed for automatically balancing said body.

4. A balancing machine for testing the balance of rotating bodies comprising an oscillatable bed member, means for journalling for rotation on said bed a body to be tested, a balancing mechanism associated with said bed and means for regulating said balancing mechanism to automatically balance said body.

5. A balancing machine for testing the balance of rotating bodies comprising a movable bed member, means for mounting a body to be tested thereon, a balancing mechanism associated with said bed, means for connecting said body and said mechanism and means associated with said bed for controlling said balancing mechanism in accordance with the degree of unbalance of said body.

6. A balancing machine for testing the balance of rotating bodies comprising a movable bed member, means for mounting a body to be tested thereon, a balancing mechanism associated with said bed and actuating means for said mechanism controlled by the movable bed member for automatically operating said balancing mechanism relative to the unbalance of said body.

7. A balancing machine for testing the balance of rotating bodies comprising a base, a movable bed supported thereon, a balancing mechanism on said bed, actuating means for said balancing mechanism and regulating means associated with said bed for automatically controlling said actuating means.

8. A balancing machine for testing the blance of rotating bodies comprising a base, a movable bed supported thereon, a balancing mechanism on said bed, actuating means for said balancing mechanism and regulating means associated with said base and bed for controlling said actuating means, said regulating means being adapted to automatically start and stop said actuating means.

9. A balancing machine for testing the balance of rotating bodies comprising a base, a movable bed supported thereon, a balancing mechanism comprising a plurality of counterbalance weights, means for effecting relative displacement of said weights, electromagnets mounted on said bed for actuating said displacing means, energizing means connected to said magnets and associated with said bed, and means for actuating said energizing means.

10. A balancing machine for testing the balance of rotating bodies comprising a base, a movable bed supported thereon, a balancing mechanism comprising a plurality of counterbalance weights, means for effecting relative displacement of said weights, electromagnets mounted on said bed for actuating said displacing means, energizing means connected to said magnets and associated with said bed, and means for regulating said actuating means in accordance with the unbalance of the body being tested.

11. A balancing machine for testing the balance of rotating bodies comprising a base, a movable bed supported thereon, a balancing mechanism comprising a plurality of counterbalance weights, means for effecting relative displacement of said weights, electromagnets mounted on said bed for actuating said displacing means, energizing means connected to said magnets and associated with said bed, and means for regulating said actuating means in accordance with the movement of said bed.

12. A balancing machine comprising a base, a movable bed mounted thereon, a balancing mechanism carried by said bed, actuating means for rendering said mechanism operative, means for journalling a rotor to be tested on said bed, means for connecting said rotor and mechanism, electromagnetic means for operating said actuating means, an induction circuit connected to said electromagnetic means, and a relay connecting said electromagnetic means and said induction circuit to energize said magnetic means by the oscillatory movement of said bed.

In testimony whereof, I have hereunto subscribed my name this 8th day of July, 1924.

WILLIAM E. TRUMPLER.